United States Patent
Reimann et al.

[11] Patent Number: 6,153,988
[45] Date of Patent: Nov. 28, 2000

[54] ARRANGEMENT FOR OPERATING AN ELECTROMAGNETIC BRAKE OF A VEHICLE

[75] Inventors: Gregor Reimann, Pentling; Karl-Heinz Roess, Ebersbach, both of Germany

[73] Assignee: DaimlerChrysler AG, Stuttgart, Germany

[21] Appl. No.: 09/159,499

[22] Filed: Sep. 23, 1998

[30] Foreign Application Priority Data

Sep. 23, 1997 [DE] Germany .................. 197 41 869

[51] Int. Cl.$^7$ .................. H02K 7/14; B60L 7/00
[52] U.S. Cl. .................. 318/5; 318/14; 318/625; 318/40; 310/77; 310/80; 188/18 A; 188/72.1; 188/162
[58] Field of Search .................. 318/3–5, 8–15, 318/625, 40; 310/75 R–77, 80, 83; 188/17–18 A, 72.1, 72.3, 158–162

[56] References Cited

U.S. PATENT DOCUMENTS

| | | | |
|---|---|---|---|
| 3,950,686 | 4/1976 | Randall | 318/564 |
| 4,546,296 | 10/1985 | Washbourn et al. | 318/372 |
| 4,546,297 | 10/1985 | Washbourn et al. | 318/372 |
| 4,546,298 | 10/1985 | Wickham et al. | 318/372 |
| 4,649,484 | 3/1987 | Herzog et al. | 701/3 |
| 4,669,359 | 6/1987 | Shiba | 91/361 |
| 5,315,526 | 5/1994 | Maeda et al. | 364/474.28 |
| 5,464,128 | 11/1995 | Keller | 222/333 |
| 5,731,640 | 3/1998 | Dietrich et al. | 310/12 |
| 5,949,168 | 9/1999 | Dieckmann et al. | 310/75 R |

FOREIGN PATENT DOCUMENTS

| | | |
|---|---|---|
| 4229042A1 | 3/1993 | Germany. |
| 4207640A1 | 9/1993 | Germany. |
| 19617796A1 | 11/1997 | Germany. |
| 19621533A1 | 12/1997 | Germany. |
| 3-500920 | 2/1991 | Japan. |
| 6-506050 | 7/1994 | Japan. |
| 10-181578 | 12/1996 | Japan. |
| WO 89/10495 | 11/1989 | WIPO. |
| WO 92/17714 | 10/1992 | WIPO. |
| WO97/36116 | 10/1997 | WIPO. |
| WO97/36117 | 10/1997 | WIPO. |
| WO97/45653 | 12/1997 | WIPO. |

OTHER PUBLICATIONS

Japanese Letter of Provisional Rejection, Appl. No. 297496/1998, Jul. 6, 1999, with partial English language translation.

*Primary Examiner*—Brian Sircus
*Attorney, Agent, or Firm*—Evenson, McKeown, Edwards & Lenahan, P.L.L.C.

[57] ABSTRACT

An arrangement for operating a brake of a vehicle has a controllable operating electric motor and a conversion device for converting the rotational movement of the operating electric motor into a translational movement of one or several brake element(s) which are in an operative connection with the conversion device. At least one additional electric motor is provided which can be controlled separately of the operating electric motor and has at least one additional conversion device for converting the rotation of the at least one additional electric motor into a translational movement of the brake element(s) which is independent of the translational movement caused by the operating motor and its conversion device.

30 Claims, 1 Drawing Sheet

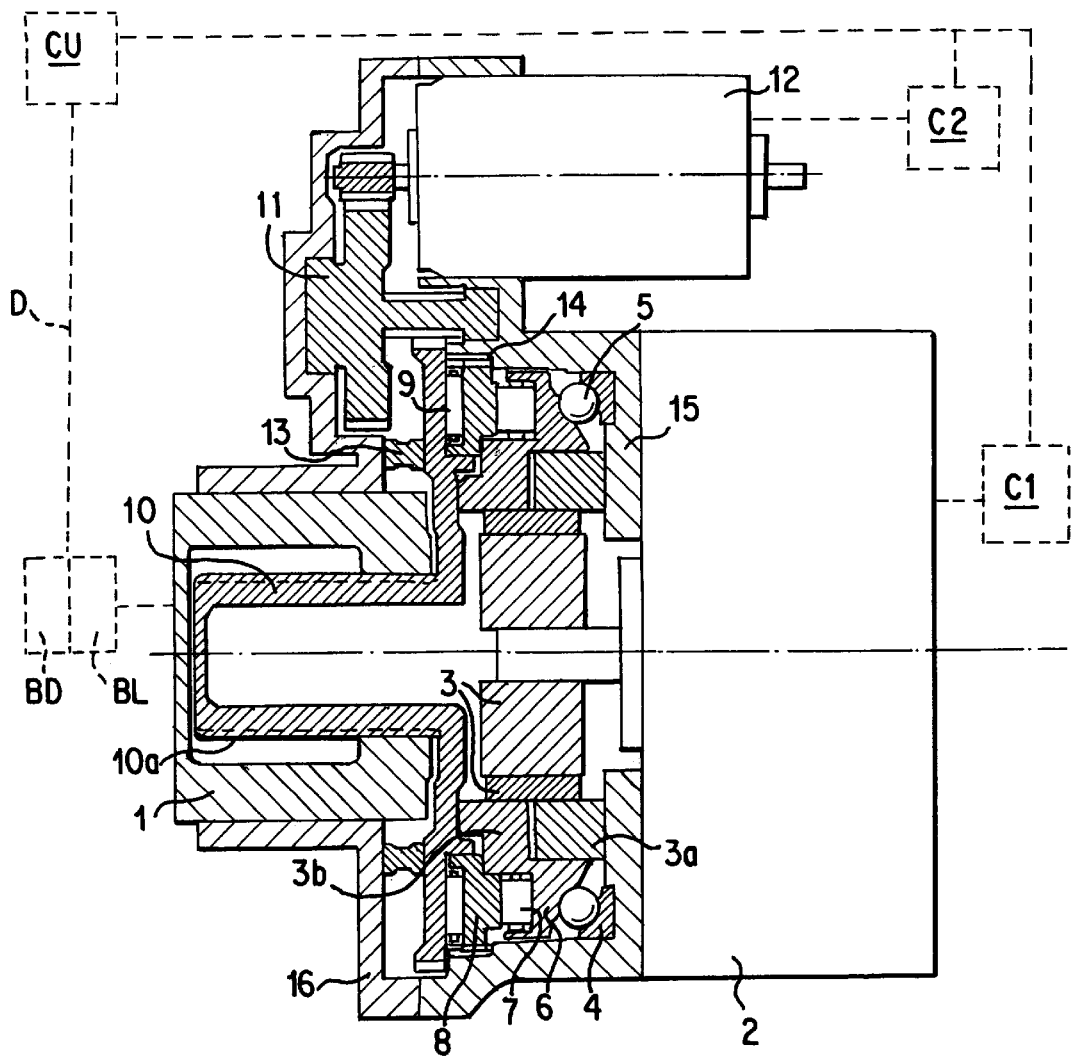

ARRANGEMENT FOR OPERATING AN ELECTROMAGNETIC BRAKE OF A VEHICLE

BACKGROUND AND SUMMARY OF THE INVENTION

This application claims the priority of German application 197 41 869.4-21, filed Sep. 23, 1997, the disclosure of which is expressly incorporated by reference herein.

The invention relates to an arrangement for operating a brake of a vehicle having a controllable operating electric motor and a conversion device for converting the rotational movement of the operating electric motor into a translational movement of one or several braking elements operatively connected with the conversion device.

The increasingly dense road traffic requires systems which promote the driver's safety and contribute to relieving the driver. In the future, the driver of a motor vehicle will be aided by so-called "by-wire systems" and, in many driving situations, will be relieved by intelligent systems.

The predominant number of current brake systems consists of hydraulic or pneumatic transmission and booster devices by means of which the driver directly defines the brake intervention of the wheel brake. In order to control driver-independent brake interventions, such as a ranging control, in addition to the pressure supply required for this purpose, a plurality of components are required, such as valves, hydraulic cylinders and the like.

Electromechanical and electrohydraulic devices have also been suggested for operating a brake of a vehicle.

Such an arrangement is described, for example, in German Patent Document DE 42 29 042 A1. In the case of this arrangement, the operating electric motor is assigned to a brake element. The conversion device converts the rotational movement of the electric motor into a translational movement which results in a linear displacement of a driving piston. Between the driving piston and a brake lining contact pressure piston, by means of which the brake linings are brought against a brake disk, a fluid chamber is provided. A brake fluid is situated in the fluid chamber.

From German Patent Document DE 42 07 640 A1, a friction brake, particularly a disk brake, is known as well as a process for braking a vehicle which has an electromagnetic friction clutch which can be brought into a controllable frictional connection with a friction member, preferably a brake disk.

The friction clutch is in a form-locking rotating engagement by way of a pinion gear with a piston, which can be axially adjusted by a V-belt drive which is independent of the rotating direction, and which is part of an application device for brake linings assigned to the brake disk.

For pressing the brake linings against the brake disk, energy is taken from the rotating vehicle wheel by means of the friction clutch and is supplied to the application device.

One problem of such electromagnetic arrangements for operating a brake of a vehicle is its reliability. Thus, for example, self-locking transmissions are used for converting the rotational movement of the electric motor into a translational movement, which, for example, in the event of a failure of the brake during a short drastic braking, lead to a remaining of the brake in the operated condition, although the braking condition should have been terminated. This results in uncontrollable danger situations.

For this reason, in the case of German Patent Document E 42 29 042 A1, the contact pressure force generated by the electric motor is transmitted by way of a fluid chamber filled with brake fluid. By means of a pressure reduction in the brake fluid, the brake can be released in danger situations, for example, when the above-described transmission locking takes place. However, despite the electric controllability, this brake operating arrangement requires the use of a hydraulic system and therefore also of a brake fluid. It therefore requires not only high expenditures but, in particular, is also less friendly to the environment than a so-called "dry" brake which requires no hydraulic fluid.

Although in the case of the brake known from German Patent Document DE 42 07 640 A1, a self-locking is impossible, the problem and the disadvantage of this brake is the fact that the electromagnetic friction clutch itself is subjected to wear and therefore requires additional maintenance work on the brake which is connected with costs.

In the case of brakes of that type, there is also the problem that special electric motors as well as complicated transmissions are required for their operation, which reduce the reliability of such an electric brake and increase the manufacturing expenditures. Furthermore, such brakes do not meet or only very poorly meet the dynamics required for many applications, for example, for an antilock system or a wheel slip control system. In addition, such brakes require a relatively large installation space which is not available, particularly in a high-performance chassis.

Finally, the relatively high weight of such brake operating arrangement as an unsprung mass also has a negative influence on the dynamics of the chassis.

It is therefore an object of the invention to provide an arrangement for operating a brake of the initially mentioned type which, while its construction is compact, permits a very fast and reliable, also intermittent operation of a "dry" brake which can be controlled in a computer-assisted manner.

In the case of an arrangement for operating a brake of a vehicle of the initially described type, this object is achieved according to the invention in that at least one additional electric motor is provided which can be controlled separately of the operating electric motor and has at least one additional conversion device for converting the rotation of the at least one electric motor into a translational movement of the brake element(s) which is independent of the translational movement caused by the operating motor and its conversion device.

By means of the additional electric motor, which can be controlled separately of the operating electric motor and has another conversion device which causes a conversion of the rotation of this electric motor into a translational movement of the brake element(s), which is independent of the translational movement caused by the operating electric motor, a release of the brake is permitted not only in any position, but also particularly in the event of a failure of the operating electric motor. As a result, an adjusting of the brake elements and thus of the brake lining for a braking of the parking brake, a fast approaching of the brake elements and thus of the brake linings for overcoming the lifting play,as well as a readjusting of the brake in the case of a wear of the brake lining, can be implemented.

As a result, a faster response of the brake is permitted and, in a particularly advantageous manner, the above-described danger situation, which is caused by a faulty operating of the brake, is avoided.

In order to increase particularly the safety of the brake, it is advantageously provided that the operating electric motor and the at least one additional electric motor have mutually separate electric circuits. As a result, it is avoided that, for example, in the event of a failure of the electric circuit of the operating electric motor, the whole brake fails since the adjusting as well as the returning of the brake is permitted by the additional electric motor and the conversion device assigned to it.

In order to permit particularly a parking brake function, it is advantageously provided that the braking element(s) can be blocked by means of the at least one additional electric motor and its conversion device. As a result, any additional parking brake devices can be eliminated on the arrangement for the operation of the brake.

It is also preferably provided that, by means of the at least one additional electric motor and its conversion device, the brake element(s) can be reset in the event of a failure of the operating motor. This effectively avoids danger situations which arise because of a failure of the operating motor.

Details of the construction and the arrangement of the electric motors and of the conversion devices has not been set forth above. Advantageously, it is provided that the conversion devices are part of a housing on which the operating electric motor as well as the additional electric motor(s) are fastened. This permits not only a compact and space-saving constructional shape but also a modular construction which, in particular, permits a simple exchangeability of the electric motors, a good access to the electric motors and, on the whole, a simple construction of the whole arrangement.

The analyzability of the electric motors also provides a diagnostic capability of the system, for example, within the scope of an on-board diagnosis.

As far as the arrangement of the operating electric motor and the conversion unit assigned to it is concerned, various embodiments are contemplated.

A particularly advantageous embodiment., which includes a compact construction, provides that the operating electric motor is arranged axially with respect to the brake element (s), and the conversion unit assigned to it comprises an axially arranged step-down transmission by means of which the brake element(s) can be operated by means of an adjusting device which causes an axial displacement of an adjusting piston.

As the result of the coaxial construction of the brake element, the operating electric motor and the step-down transmission, a particularly a simple and compact construction is permitted which, in addition, requires only a few component parts.

Advantageously, the step-down gear is a harmonic drive transmission.

As far as the arrangement of the at least one additional electric motor and the construction of the conversion unit assigned to it is concerned, it is advantageously provided that the at least one additional electric motor is arranged parallel to the axis of the operating electric motor, and the conversion device assigned to it is a transmission which operates the adjusting device. As the result of the fact that the at least one additional electric motor by way of the transmission assigned to it is in an engagement with the adjusting device, which transmission can, on the other hand, also be operated by the operating electric motor, in a particularly simple manner, an operation of the arrangement is permitted by means of two electric motors which both cause an operation of the brake elements.

In this case, the transmission is preferably a spur gear which permits an extremely compact construction.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a schematic sectional view of an arrangement for operating a brake of a vehicle constructed according to a preferred embodiment of the invention.

DETAILED DESCRIPTION OF THE DRAWINGS

An embodiment of an arrangement for operating a brake of a (not shown) vehicle illustrated in the FIGURE comprises a housing which is composed of two mutually connected housing pars 15, 16. An operating electric motor 2 is flanged to one of the two housing parts 15 and drives a step-down gear 3, such as a harmonic-drive transmission or a toothed differential mechanism. A part 3a of the step-down gear 3 is fixedly connected with the housing part 15, while another part 3b of the step-down gear 3 is used for the drive of a first sloped disk 6.

The axially fixed first sloped disk 6 is axially and radially supported by means of a bearing 5 against the housing part 15.

In order to ensure a running which is low in noise and wear, with little friction and a high efficiency, the bearing 5 is provided with a correspondingly equipped running surface 4 which is arranged on the one housing part 15. Between the first sloped disk 6 and the second sloped disk 8, running bodies 7 are arranged in the circumferential direction. These running bodies 7 move on the sloped paths of the two sloped disks 6, 8.

A cage, which is not shown, provides the positioning of the individual running bodies 7.

A rotation of the axially fixed first sloped disk 6 results in an axial movement of the non-rotatable second sloped disk 8. For the axial and radial guiding of the non-rotatable second sloped disk 8, a ring 14 is provided. The axial movement of the second sloped disk 8 is transmitted by way of a bearing 9 and an adjusting element 10 to the braking element in the form of an adjusting piston 1 which, in turn, causes a braking intervention at schematically depicted brake linings.

Between the second housing part 16 and the adjusting element 10, a spring element 13 is arranged which promotes the restoring of the adjusting element 10 and thus of the adjusting piston and, as a result, of the whole brake, in the event of a reverse axial movement caused by a rotation of the first sloped disk 6 in the reverse direction, and which is simultaneously used for fixing the above-described component parts.

The two sloped disks 6, 8, the bearing 5, the adjusting element 10 of the pistons together form an adjusting device for the axial displacement of the piston 10 and, as a result, of the brake linings BL which can be operated by it in a manner known per se.

In conjunction with the step-down gear in the form of the harmonic drive gear, the adjusting device forms a conversion unit for converting the rotational movement of the operating electric motor 2 into a translational movement of the adjusting piston 1 and thus into a movement of the brake linings BL toward a schematically depicted brake disk BD.

In parallel to the axis of the operating electric motor 2, another electric motor 12 is flanged to the housing half 15, the torque of the additional electric motor 12 being transmitted by way of a spur gear disposed in the housing halves 15, 16 to the adjusting element 10.

As illustrated in the FIG., a transmission gear wheel of the spur gear 11 engages in an external toothing of the adjusting element 10. As a result, the adjusting element 10 can be caused to carry out a rotational movement. The axial displacement of the adjusting piston 1 is caused by a thread 10a provided on the cylindrical part of the adjusting element 10, in which thread 10a an internal thread of the adjusting piston 1 engages which is adapted to this thread 10a. A rotational movement of the adjusting element 10 is thus converted into the translational movement of the non-rotatable adjusting piston. In this manner, by operating the adjusting element 10, the non-rotatable adjusting piston 1 can be moved in the axial direction. Since the adjusting element 10 runs axially on the bearing 9 and is radially guided by the second sloped disk 8, it is ensured that the toothing of the adjusting element 10 engages in any position of the second sloped disk 8 in the toothing of a gear wheel of the spur gear 11 connected with the engine shaft of the additional electric motor 12.

The spur gear 11 is designed such that it has a high efficiency.

It is understood that the operating electric motor 2 and the additional electric motor 12 can be operated independently of one another as well as simultaneously with one another. By means of a simultaneous operation of both electric motors 2, 12, high dynamics are obtained during an adjustment, that is, when the adjusting element 10 and the adjusting piston 1 are operated.

By means of an operation of the adjusting element 10, which is independent of the operation of the operating electric motor 2, and thus of the adjusting piston 1, by the electric motor 12, for example, a parking brake function is achieved. Furthermore, in this manner, a readjusting of the brake linings is possible in the case of wear.

Furthermore, the adjusting piston 1 can be reset at any time also in the event of a failure of the operating electric motor 2 by means of the electric motor 12 and of the spur gear 11 by way of the adjusting element 10.

In particular, this is also possible because the current supply of the two electric motors 2, 12 takes place by two mutually independent electric circuits C1 and C2 so that, for example, in the event of a failure of one of the two circuits, an emergency operation can be maintained by the other circuit.

By means of this separate controlling and power supply of the two electric motors 2, 12, the safety of the whole brake operating arrangement is significantly increased.

This arrangement for operating a brake is largely insensitive with respect to lateral forces because of its above-described constructive design.

By means of the electric operation, which takes place, for example, by means of a schematically depicted control unit CU, a diagnosis is also possible, particularly also an on-board diagnosis, as schematically depicted by line D between the brake disk lining assembly and control unit CU.

In addition, the use of the two electric motors 2, 12, while the constructional shape is compact, also permits a very fast, reliable and also intermittent operation of the brake so that such a brake can be used without the use of a pressurized hydraulic fluid also in the case of antilock systems and wheel slip control systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Arrangement for operating a brake of a vehicle comprising:

a controllable operating electric motor, a conversion device for converting the rotational movement of the operating electric motor into a translational movement of at least one brake element in an operative connection with the conversion device, at least one additional electric motor which can be controlled separately from the operating electric motor, and at least one additional conversion device for converting the rotation of the at least one additional electric motor into a translational movement of the at least one brake element which is independent of and in bypassing relationship with respect to the translational movement operating motor and its conversion device.

2. Arrangement according to claim 1, wherein the operating electric motor and the at least one additional electric motor have mutually separate electric circuits.

3. Arrangement according to claim 1, wherein the operating electric motor and the at least one additional electric motor can be operated simultaneously as well as independently of one another.

4. Arrangement according to claim 2, wherein the operating electric motor and the at least one additional electric motor can be operated simultaneously as well as independently of one another.

5. Arrangement according to claim 1, wherein the at least one brake element can be blocked by means of the at least one additional electric motor and its conversion device.

6. Arrangement according to claim 2, wherein the at least one brake element can be blocked by means of the at least one additional electric motor and its conversion device.

7. Arrangement according to claim 3, wherein the at least one brake element can be blocked by means of the at least one additional electric motor and its conversion device.

8. Arrangement according to claim 1, wherein the conversion devices are part of a housing on which the operating electric motor as well as the at least one additional electric motor are fastened.

9. Arrangement according to claim 2, wherein the conversion devices are part of a housing on which the operating electric motor as well as the at least one additional electric motor are fastened.

10. Arrangement according to claim 3, wherein the conversion devices are part of a housing on which the operating electric motor as well as the at least one additional electric motor are fastened.

11. Arrangement according to claim 5, wherein the conversion devices are part of a housing on which the operating electric motor as well as the at least one additional electric motor are fastened.

12. Arrangement according to claim 1, wherein the operating motor is arranged axially with respect to the at least one brake element and the conversion unit assigned to it is an axially arranged step-down gear by means of which the at least one brake element can be operated by way of an adjusting device which causes an axial movement of an adjusting piston.

13. Arrangement according to claim 2, wherein the operating motor is arranged axially with respect to the at least one brake element and the conversion unit assigned to it is an axially arranged step-down gear by means of which the at least one brake element can be operated by way of an adjusting device which causes an axial movement of an adjusting piston.

14. Arrangement according to claim 3, wherein the operating motor is arranged axially with respect to the at least one brake element and the conversion unit assigned to it is an axially arranged step-down gear by means of which the at least one brake element can be operated by way of an adjusting device which causes an axial movement of an adjusting piston.

15. Arrangement according to claim 5, wherein the operating motor is arranged axially with respect to the at least one brake element and the conversion unit assigned to it is an axially arranged step-down gear by means of which the at least one brake element can be operated by way of an adjusting device which causes an axial movement of an adjusting piston.

16. Arrangement according to claim 8, wherein the operating motor is arranged axially with respect to the at least one brake element and the conversion unit assigned to it is an axially arranged step-down gear by means of which the at least one brake element can be operated by way of an adjusting device which causes an axial movement of an adjusting piston.

17. Arrangement according to claim 12, wherein the step-down gear is a harmonic-drive gear.

18. Arrangement according to claim 12, wherein that the at least one additional electric motor is arranged in parallel to the axis of the operating electric motor and the conversion device assigned to it comprises a transmission which operates the adjusting device.

19. Arrangement according to claim 17, wherein that the at least one additional electric motor is arranged in parallel to the axis of the operating electric motor and the conversion device assigned to it comprises a transmission which operates the adjusting device.

20. Arrangement according to claim 18, wherein the transmission is a spur gear.

21. A vehicle wheel brake assembly comprising:
   a housing
   a brake element actuating piston supported for linear movement in the housing,
   a first electric motor having a rotatably driven first motor shaft,
   a first conversion device operable to convert rotational movement of the first motor shaft into linear movement of the piston,
   a second electric motor having a rotatably driven second motor shaft, and
   a second conversion device operable to convert rotational movement of the second motor shaft into linear movement of the piston independently of the linear movement of and bypassing relationship with respect to the piston by way of the first motor and first conversion device.

22. A brake assembly according to claim 21, comprising a braking element operably connected to the piston to be moved into and out of braking engagement in response to linear movement of the piston.

23. A brake assembly according to claim 22, wherein said first and second motors are supported in said housing with said first and second shafts spaced from and parallel with one another.

24. A brake assembly according to claim 23, wherein said first and second conversion devices include respective gears mounted on said shafts.

25. A brake assembly according to claim 21, wherein said first and second electric motors are operably connected in mutually separate electric circuits.

26. A brake assembly according to claim 21, comprising a control unit for said first and second motors to be selectively operable simultaneously and independently of one another.

27. Arrangement according to claim 1, wherein the operating electric motor is configured coaxial with the brake element and the associated conversion device includes gear members coaxial with an output driving shaft of the operating electric motor.

28. Arrangement according to claim 27 wherein the additional electric motor is disposed adjacent to and parallel to the operating electric motor and its conversion device includes a gear train operable to rotate a threaded member coaxial with the brake element and output shaft of the operating electric motor.

29. Brake assembly according to claim 21, wherein the first electric motor and the first motor shaft are coaxial with the brake element actuating piston.

30. Brake assembly according to claim 29 wherein the second electric motor and its second motor shaft are disposed laterally adjacent to and parallel to the first electric motor and first motor shaft, and
   wherein the second conversion device includes a gear train operatively rotating a threaded member extending coaxially with the piston to axially move the piston.

* * * * *